(12) United States Patent
Restuccia et al.

(10) Patent No.: US 10,213,984 B2
(45) Date of Patent: Feb. 26, 2019

(54) COMPOSITE MATERIALS WITH HIGH Z-DIRECTION ELECTRICAL CONDUCTIVITY

(71) Applicant: Cytec Industries Inc., Princeton, NJ (US)

(72) Inventors: Carmelo Luca Restuccia, Chester (GB); Fiorenzo Lenzi, Vitulazio (IT); Mark Bonneau, Brea, CA (US); Josanlet Villegas, Irvine, CA (US); Emiliano Frulloni, Wrexham (GB)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 166 days.

(21) Appl. No.: 14/860,000

(22) Filed: Sep. 21, 2015

(65) Prior Publication Data

US 2016/0082691 A1    Mar. 24, 2016

Related U.S. Application Data

(60) Provisional application No. 62/053,469, filed on Sep. 22, 2014.

(51) Int. Cl.
*B32B 5/02* (2006.01)
*B32B 37/20* (2006.01)
(Continued)

(52) U.S. Cl.
CPC ............. *B32B 5/022* (2013.01); *B32B 5/00* (2013.01); *B32B 5/02* (2013.01); *B32B 5/22* (2013.01);
(Continued)

(58) Field of Classification Search
CPC ........ B32B 2262/106; B32B 2264/105; B32B 2264/108; B32B 2264/0214;
(Continued)

(56) References Cited

U.S. PATENT DOCUMENTS

| 5,433,995 A | 7/1995 | Matthews et al. |
| 7,041,192 B2 | 5/2006 | Delanoy et al. |

(Continued)

FOREIGN PATENT DOCUMENTS

| CN | 102909905 | * | 2/2013 |
| WO | 2008135559 A1 | | 11/2008 |
| WO | 2008146014 A2 | | 12/2008 |

OTHER PUBLICATIONS

International Search Report. PCT/US2015/051202, dated Dec. 18, 2015.

*Primary Examiner* — Camie S Thompson
(74) *Attorney, Agent, or Firm* — Thi Dang

(57) ABSTRACT

A curable composite material having high z-direction electrical conductivity. The curable composite material includes two or more layers of reinforcement carbon fibers that have been infused or impregnated with a curable matrix resin and an interlaminar region containing at least conductive nano-sized particles, e.g. carbon nanotubes, and a light-weight carbon veil. According to another embodiment, the interlaminar region further contains polymeric toughening particles. Methods for fabricating composite materials and structures are also disclosed.

17 Claims, 6 Drawing Sheets

(51) Int. Cl.

| | |
|---|---|
| *B32B 37/06* | (2006.01) |
| *B32B 37/10* | (2006.01) |
| *B32B 5/00* | (2006.01) |
| *B32B 5/22* | (2006.01) |
| *B32B 5/28* | (2006.01) |
| *B32B 7/00* | (2019.01) |
| *B32B 7/02* | (2019.01) |
| *B32B 7/12* | (2006.01) |
| *B32B 9/00* | (2006.01) |
| *B32B 9/04* | (2006.01) |
| *B32B 15/00* | (2006.01) |
| *B32B 15/04* | (2006.01) |
| *B32B 19/00* | (2006.01) |
| *B32B 19/02* | (2006.01) |
| *B32B 19/04* | (2006.01) |
| *B32B 25/00* | (2006.01) |
| *B32B 25/02* | (2006.01) |
| *B32B 25/04* | (2006.01) |
| *B32B 25/16* | (2006.01) |
| *B32B 27/00* | (2006.01) |
| *B32B 27/06* | (2006.01) |
| *B32B 27/12* | (2006.01) |
| *B32B 27/14* | (2006.01) |
| *B32B 27/18* | (2006.01) |
| *B32B 27/26* | (2006.01) |
| *B32B 27/28* | (2006.01) |
| *B32B 27/30* | (2006.01) |
| *B32B 27/34* | (2006.01) |
| *B32B 27/42* | (2006.01) |

(52) U.S. Cl.
CPC .................. *B32B 5/28* (2013.01); *B32B 7/00* (2013.01); *B32B 7/02* (2013.01); *B32B 7/12* (2013.01); *B32B 9/00* (2013.01); *B32B 9/04* (2013.01); *B32B 15/00* (2013.01); *B32B 15/04* (2013.01); *B32B 19/00* (2013.01); *B32B 19/02* (2013.01); *B32B 19/04* (2013.01); *B32B 25/00* (2013.01); *B32B 25/02* (2013.01); *B32B 25/04* (2013.01); *B32B 25/16* (2013.01); *B32B 27/00* (2013.01); *B32B 27/06* (2013.01); *B32B 27/12* (2013.01); *B32B 27/14* (2013.01); *B32B 27/18* (2013.01); *B32B 27/26* (2013.01); *B32B 27/28* (2013.01); *B32B 27/286* (2013.01); *B32B 27/30* (2013.01); *B32B 27/302* (2013.01); *B32B 27/308* (2013.01); *B32B 27/34* (2013.01); *B32B 27/42* (2013.01); *B32B 37/06* (2013.01); *B32B 37/10* (2013.01); *B32B 2250/40* (2013.01); *B32B 2255/00* (2013.01); *B32B 2255/02* (2013.01); *B32B 2255/205* (2013.01); *B32B 2262/00* (2013.01); *B32B 2262/02* (2013.01); *B32B 2262/10* (2013.01); *B32B 2262/103* (2013.01); *B32B 2262/106* (2013.01); *B32B 2262/108* (2013.01); *B32B 2264/0214* (2013.01); *B32B 2264/108* (2013.01); *B32B 2305/076* (2013.01); *B32B 2305/72* (2013.01); *B32B 2307/20* (2013.01); *B32B 2307/202* (2013.01); *B32B 2307/50* (2013.01); *B32B 2605/00* (2013.01); *B32B 2605/18* (2013.01); *Y02T 50/43* (2013.01)

(58) Field of Classification Search
CPC . B32B 2307/558; B32B 37/182; B32B 5/022; B32B 5/28; B32B 2605/18; B32B 2260/08; B32B 15/04; B32B 19/02; B32B 19/04; B32B 2250/40; B32B 2262/00; B32B 2262/10; B32B 2307/202; B32B 2605/00; B32B 2605/19; B32B 27/00; B32B 27/06; B32B 27/12; B32B 27/14; B32B 27/18; B32B 27/28; B32B 37/06; B32B 37/10; B32B 5/00; B32B 5/22; B32B 7/00; B32B 9/00; B32B 9/04; Y10T 442/2107; Y10T 442/60; Y10T 442/24995; Y10T 442/674; D04H 1/4242; B29C 70/025; B29C 70/02
USPC ..... 156/307.1, 182; 442/417, 377, 379, 286, 442/394
See application file for complete search history.

(56) References Cited

U.S. PATENT DOCUMENTS

| | | | |
|---|---|---|---|
| 7,931,958 B2 | 4/2011 | Arai et al. | |
| 2008/0295955 A1* | 12/2008 | Cawse | B32B 5/22 156/276 |
| 2010/0021682 A1 | 1/2010 | Liang et al. | |
| 2011/0108192 A1 | 5/2011 | Pepka et al. | |
| 2011/0159764 A1* | 6/2011 | Price | B32B 15/08 442/228 |
| 2011/0294387 A1 | 12/2011 | Simmons et al. | |
| 2013/0052897 A1* | 2/2013 | Rogers | B32B 27/12 442/58 |
| 2014/0135443 A1* | 5/2014 | Aerts | C08L 63/00 524/538 |
| 2014/0370237 A1* | 12/2014 | Ponsolle | D04H 3/12 428/136 |
| 2015/0166743 A1* | 6/2015 | Restuccia | C08J 5/10 428/327 |

\* cited by examiner

COMPOSITE MATERIALS WITH HIGH Z-DIRECTION ELECTRICAL CONDUCTIVITY

This application claims the benefit of U.S. Provisional Patent Application No. 62/053,469, filed Sep. 22, 2014, the disclosure of which is incorporated by reference in its entirety.

BACKGROUND

In the aerospace industry, the use of fiber-reinforced polymer composites in primary and secondary structures of aircraft is becoming more prevalent. Composite structures are traditionally made by laying up plural layers (or plies) of resin-impregnated fibrous reinforcement (known as prepregs) on a mold surface, followed by consolidating and/or curing. The advantages of fiber-reinforced polymer composites include high strength-to-weight ratio, excellent fatigue endurance, corrosion resistance and flexibility, allowing for a significant reduction in component parts, and reducing the need for fasteners and joints. However, the application of these materials for modern aircraft's primary and secondary structures presents special challenges due to the dielectric nature of the matrix resin. Although the use of carbon fibers as reinforcing fibers in composite materials can deliver some degree of electrical conductivity along their longitudinal direction due to their graphitic nature, the dielectric properties of the matrix resins in the composite materials reduce the overall electrical conductivity of the composite materials.

DETAILED DESCRIPTION

Increasing the electrical conductivity of fiber-reinforced polymer composites is desirable in order to meet the requirements for lightning strike protection of an aircraft and to avoid a phenomenon called "edge glow", particularly for the composite wing assembly. The edge glow phenomenon manifests itself as a bright glow or spark in composite skin/spar assembly with energy sufficient to be a potential ignition source of fuel vapors.

This edge glow phenomenon may appear during a lightning strike event, especially on composite laminates having low z-direction electrical conductivity. During a lightning strike event, a transient charge with high intensity current travels through the skin and then enters the wing substructure (e.g. structural spar or ribs) because of the fasteners connecting the two composite parts. So typically, in a composite skin/spar assembly, current travels partially on the skin and partially through the spar which represents one of the walls of the fuel tank.

The current passes laterally from the fasteners through adjacent composite plies of the spar and tends to travel along the fibers because of the higher electrical conductivity as compared to the resin matrix. This path may generate the typical bright glow or sparks at the spar/rib cap edge, which is called "edge glow" phenomenon by those skilled in the art.

Figure 1:
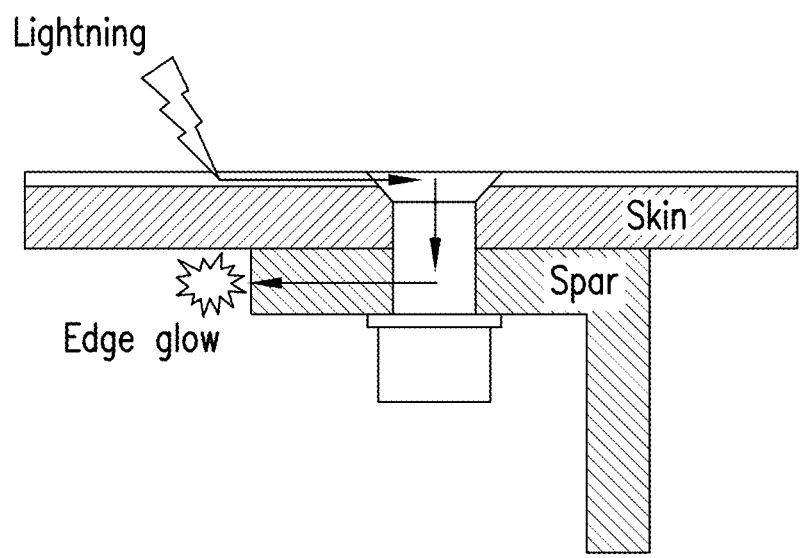
FIG. 1 shows the typical current path during a lightning strike event on a composite wing box generating the "edge glow" phenomenon.

FIG. 1 shows a potential critical current path during a lightning strike event on a composite wing box. The edge glow phenomenon appears more critical when the resin between the fiber reinforcement plies is highly resistive, and consequently, the current tends not to flow between adjacent plies. If the z-direction electrical conductivity is too low, significant voltage drops can be produced between plies during the strike, thus increasing the risk of edge glow.

Edge glow phenomenon is associated with electron surface ejections or plasma generation at the composite edges and often appears as a kind of resin explosion. Uncertainty regarding the nature of this phenomenon has posed several attentions in relation to the ignition capabilities of fuel vapors during a lightning strike event.

Figure 2:
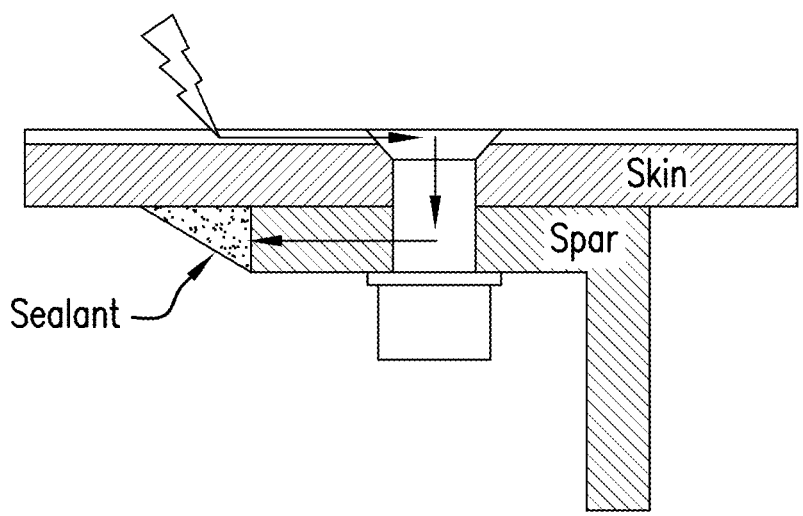
FIG. 2 shows a sealant applied at spar cap edge of the typical construction of a composite wing.

A conventional solution is to apply a sealant at the fuel tank (see FIG. 2). An example of such fuel tank sealant is the PR 1776 Class B sealant from Le Joint Francais, FR. However, such method leads to additional weight and is not always effective due to the lack of standardization and difficulties in the sealant application. Over time, the sealant becomes ineffective due to aging, or can be totally washed off by the fuel in the tank. Moreover, a lightning strike can result in the generation of high pressure gasses at the cut edge which may shatter the edge seal. There remains a need for a multifunctional composite material that can address the edge glow issue discussed above while providing good mechanical properties such as resistance to impact and delamination.

It is widely accepted in the aerospace industry that two of the main design drivers for aircrafts composite structures are their resistance to specific impacts and to the propagation of the damage after such events.

Delamination is an important failure mode for composite materials. Delamination occurs when two laminated layers de-bond from each other. Important design limiting factors include the energy needed to initiate the delamination and the energy needed to propagate it.

The need to improve the impact resistance performance of composite structures, especially for aircrafts primary structures, has triggered the development of a new generation of composite materials toughened with interlaminar toughening particles, often defined as "third generation composite materials". Such technological solution provides high impact resistance to carbon fiber-reinforced composites but also creates an electrically insulating inter-laminar region between adjacent plies, resulting in a significant reduction in the overall composite structure's electrical conductivity especially in the z-direction. The "z-direction" refers to the direction orthogonal to the plane on which the reinforcing fibers are arranged in a composite structure or the axis through the thickness of the composite structure.

The electrical conductivity of composite materials can be improved by incorporating different conductive materials, such as conductive particles, in the matrix resin of the fiber-reinforced polymer composite, or in the interlaminar regions of a multilayered composite structure, e.g. prepreg layup. For example, metallic fillers may be added at high loadings to increase the resin electrical conductivity, but this leads to significant weight gain and reduction in impact resistance-related properties such as Compression Strength After Impact (CSAI or CAI) and interlaminar fracture toughness. As such, the state-of-the art solutions are such that the z-direction conductivity of a composite can be improved but not, simultaneously, its mechanical performance. A cured composite with improved impact performance is one with improved CAI and fracture toughness. CAI measures the ability of a composite material to tolerate damage. In the test for measuring CAI, the cured composite is subjected to an impact of a given energy and then loaded in compression. The damage area and the dent depth are measured following the impact and prior to the compression test. During this test, the composite material is constrained to ensure that no elastic instability is taking place and the strength of the composite material is recorded.

Fracture toughness is a property which describes the ability of a material containing a crack to avoid the fracture, and is one of the most important properties of a material for aerospace applications. Fracture toughness is a quantitative way of expressing a material's resistance to brittle fracture when a crack is present.

Fracture toughness may be quantified as strain energy release rate ($G_c$), which is the energy dissipated during fracture per unit of newly created fracture surface area. $G_c$ includes $G_{Ic}$ (Mode 1—opening mode) or $G_{IIc}$ (Mode II—in plane shear). The subscript "Ic" denotes Mode I crack opening, which is formed under a normal tensile stress perpendicular to the crack, and the subscript "IIc" denotes Mode II crack produced by a shear stress acting parallel to the plane of the crack and perpendicular to the crack front. The initiation and growth of a delamination can be determined by examining Mode I fracture toughness.

In some embodiments, the combination of conductive nano-particles and light weight carbon veil at the interlaminar region of a multilayered composite material produce a synergistic effect that results in an improvement in the z-direction electrical conductivity. Furthermore, with the addition of specific polymeric toughening particles, an improvement in CAI and $G_{Ic}$ can also be obtained. In some instances, it has been found that the combination of conductive nano-particles and carbon veil results in z-direction electrical conductivity that is more than 2 order of magnitude higher as compared to the unmodified version of the same composite material without any reduction in mechanical performance, including CAI and delamination resistance in Mode I ($G_{Ic}$), and without negatively affecting the material manufacture ability and process ability. Moreover, the conductivity effect obtained from having the combination of conductive nano-particles and carbon veil is much greater than the sum of their individual conductivity effects.

One embodiment of the present disclosure is directed to a curable composite material composed of two or more layers of reinforcement fibers that have been infused or pre-impregnated with a curable or thermosettable resin. The interlaminar region between adjacent layers of reinforcement fibers contains conductive nano-particles dispersed throughout a curable matrix resin, polymeric toughening particles and a carbon veil embedded in the same matrix resin. The conductive nano-particles are significantly smaller in size as compared to the polymeric toughening particles. The polymeric toughening particles may be substantially insoluble in the matrix resin upon curing of the composite material, and remain as discreet particles at the interlaminar region after curing (referred herein as "insoluble" particles). In some embodiments, the polymeric toughening particles are swellable particles, which increase in size when the surrounding resin is heated. In some embodiments, the polymeric toughening particles include both insoluble particles and "soluble" thermoplastic particles. "Soluble" thermoplastic particles refer to solid particles that dissolve into the surrounding matrix resin when the mixture thereof is heated or during the curing cycle of the matrix resin, and do not remain as discreet particles in the cured resin matrix.

The resin at the interlaminar region (without conductive nano-particles, carbon veil or toughening particles) may be the same or different from the matrix resin impregnating the reinforcement fibers. In some embodiments, the matrix resin impregnating the reinforcement fibers also contains conductive nano-particles dispersed therein.

Figure 3:
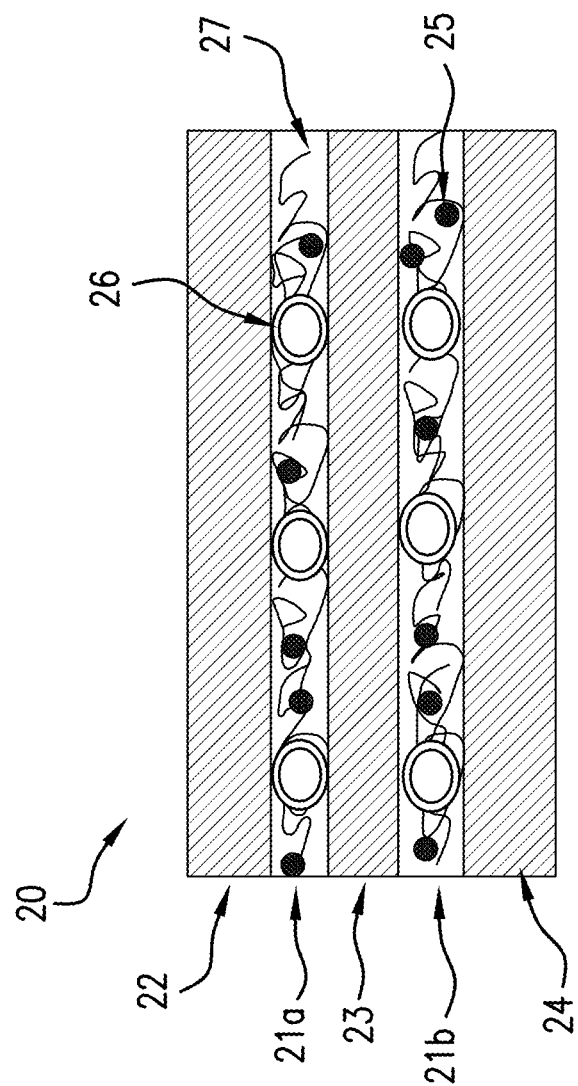
FIG. 3 schematically illustrates a curable composite material with interlaminar regions containing polymeric toughening particles, conductive nano-particles and carbon veils according to an embodiment of the present disclosure.

FIG. 3 schematically illustrates a curable composite material 20 according to an embodiment of the present disclosure. The composite material 20 contains interlaminar regions 21a and 21b formed between layers 22, 23, 24 of reinforcement fibers that have been infused or impregnated with a curable matrix resin. Each of the interlaminar regions 21a and 21b contains a curable matrix resin with conductive nano-particles 25 dispersed therein, polymeric toughening particles 26 and a carbon veil 27 embedded in the same matrix resin. The composition of the interlaminar resin (without conductive nano-particles 25, toughening particles 26, and carbon veil 27) may be similar to or different from that of the matrix resin impregnating fiber layers 22, 23, 24. When the interlaminar resin is similar to that of the matrix resin impregnating fiber layers 22, 23, 24, the resin matrices contain one or more thermoset resins in common. The polymeric toughening particles 26 may be positioned side by side, and together form a single layer of particles. In this manner, the depth of the interlaminar region is determined by the sizes of the particles. In some embodiments, the toughening particles 26 are similar in size (e.g., spherical particles having approximately the same diameter) and the depth of the interlaminar region is about the same or slightly greater than the average diameter of the toughening particles 26.

In some embodiments, the cured composite material containing the combination of conductive nano-particles, polymeric toughening particles and carbon veil in the interlaminar region has the following properties: electrical conductivity in the z-direction of at least about 10 S/m (Siemens per meter), for example, from about 10 S/m to about 100 S/m, as measured in DC conditions according to a 4-probe testing method, CAI at 270 in-lbs (or 30.5 J) of at least about 35 Ksi, for example, from about 35 Ksi (or about 241 MPa) to about 55 Ksi (or about 379 MPa), as measured in accordance with ASTM-D7137, and interlaminar fracture toughness under mode I ($G_{Ic}$) of at least about 1.7 in-lb/in², for example, from about 1.7 in-lb/in² (or about 296 J/m²) to about 5 in-lb/in² (or about 870 J/m²), as measured in accordance to ASTM-D5528.

In an alternative embodiment, the interlaminar region between adjacent layers of reinforcement fibers contains the combination of conductive nano-particles dispersed throughout a matrix resin and a carbon veil embedded in the same matrix resin, but no polymeric toughening particles are present. As an example, the curable composite material as illustrated in FIG. 3 may be modified so that the interlaminar regions 21a and 21b contain a curable matrix resin with dispersed conductive nano-particles 25 and the carbon veil 27, but no polymeric toughening particles 26. In this embodiment, the depth of the interlaminar region is determined by the thickness of the carbon veil.

In some embodiments, the combination of conductive nano-particles and light weight carbon veil at the interlaminar region of a multilayered composite material produce a synergistic effect that results in an improvement in the z-direction electrical conductivity. In some instances, it has been found that the combination of conductive nano-particles and carbon veil results in z-direction electrical conductivity that is more than 1 order of magnitude higher as compared to the unmodified version of the same composite material but no reduction in mechanical performance including CAI and delamination resistance in Mode I ($G_{Ic}$). Moreover, the conductivity effect obtained from having the combination of conductive nano-particles and carbon veil is much greater than the sum of their individual conductivity effects.

In some embodiments, the cured composite material containing the combination of conductive nano-particles and carbon veil but no polymeric particles at the interlaminar region, has the following properties: electrical conductivity in the z-direction of at least about 10 S/m (Siemens per meter), for example, from about 10 S/m to about 100 S/m, as measured in DC conditions according to a 4-probe testing method, CAI at 270 in-lbs (or 30.5 J) of at least about 25 Ksi, for example, from about 25 Ksi (or about 172 MPa) to about 45 Ksi (or about 310 MPa), as measured in accordance with ASTM-D7137 and interlaminar fracture toughness under mode I ($G_{Ic}$) of at least about 1.2 in-lb/in$^2$, for example, from about 1.2 in-lb/in$^2$ (or about 210 J/m$^2$) to about 3 in-lb/in$^2$ (or about 522 J/m$^2$), as measured in accordance to ASTM-D5528.

The composite material disclosed herein is a multifunctional material, which may be successfully used in those aircrafts applications where high mechanical performance and high electrical conductivity are required. In cured state, the composite material's improved electrical conductivity can function to spread out or dissipate electric currents, such as those generated by a lightning strike, over a greater area of a composite structure produced from the composite material, thereby reducing the likelihood of a catastrophic damage to localized portions of the composite structure. As such, using this multifunctional composite material can be an efficient solution for mitigating lightning strike's direct effect and for preventing the edge glow phenomenon in composites discussed above. Furthermore, the cured composite material provides the additional benefit of electromagnetic shielding.

Conductive Nano-Particles

The term "nano-particles" as used herein, refers to materials having at least one dimension smaller than about 0.1 micrometer (<100 nanometers) and an aspect ratio from about 50:1 to about 5000:1. The dimensions of the nano-particles can be determined by a Dynamic Light Scattering (DSL) technique. For example, a nanoparticle analyzer such as SZ-100 from Horiba may be used.

The nano-particles may be of any suitable three-dimensional shapes including, for example, spherical, ellipsoidal, spheroidal, discoidal, dendritic, rods, discs, cuboid or polyhedral.

The term "aspect ratio" as used herein refers to the ratio of the longest dimension to the shortest dimension of a 3-dimensional body. When this term is used in relation to spherical or substantially spherical particles, the relevant ratio would be that of the largest cross sectional diameter to the smallest cross sectional diameter of the spherical body. As an example, a perfectly spherical particle would have an aspect ratio of 1:1.

In one embodiment, the nano-particles are carbon nano-particles composed entirely or mostly of carbon atoms arranged, at the molecular scale, in pentagons or hexagons, or both. Suitable carbon nano-sized structures for the intended purpose herein include, but are not limited to, carbon nano-tubes, carbon nano-fibers, carbon nano-ropes, carbon nano-ribbons, carbon nano-fibrils, carbon nano-needles, carbon nano-sheets, carbon nano-rods, carbon nano-cones, carbon nano-scrolls (scroll-like shapes) and carbon nano-ohms, carbon black, graphite nano-platelets or nano-dots, graphenes, and other types of fullerene materials. Any of these fullerene materials may have a partial or total metallic coating.

The preferred carbon nanoparticles are carbon nano-tubes (CNTs). Typically, CNTs are tubular, strand-like structures having external diameters in the range of about 0.4 nm to about 100 nm, for example, the external diameter may be less than about 50 nm or less than about 25 nm.

The CNTs may be of any chirality. Armchair nanotubes are contemplated. Moreover, the CNTs may be semiconducting nanotubes or any other type that displays electrical conductivity. Suitable CNTs may include single-walled carbon nano-tubes (SWCNTs), double-walled carbon nano-tubes (DWCNTs) and multi-walled carbon nanotubes (MW-CNTs). In one embodiment, the carbon nanomaterials are MWCNTs.

In another embodiment, the conductive nanoparticles may include metallic nano-particles, metal or carbon coated nano-particles and combinations thereof, having an electrical conductivity greater than about $5 \times 10^3$ S/m. Suitable metallic nano-particles include particles of any known metals including, but are not limited to, silver, gold, platinum, palladium, nickel, copper, lead, tin, aluminum, titanium, alloys and mixtures thereof. In some embodiments, the metallic materials have an electrical conductivity of about $1 \times 10^7$ S/m or higher, or about $3 \times 10^7$ S/m or higher, for example, in the range from about $1 \times 10^7$ S/m to about $7 \times 10^7$ S/m. Electrical conductivity of carbon or metallic solid materials can be determined using four-point methods or using the eddy current method according to DIN EN 2004-1 and ASTM E 1004.

Suitable organic or inorganic nano-particles which may be metal coated include, but are not limited to, nanoclays, carbon nanotubes, carbon nanofibers, fullerenes, carbon nano-ropes, carbon nano-ribbons, carbon nano-fibrils, carbon nano-needles, carbon nano-sheets, carbon nano-rods, carbon nano-cones, carbon nano-scrolls and carbon nano-ohms, as well as the corresponding boron nitride components, inorganic nanoparticles or nanofibres such as, glass nanospheres, silica nanospheres, silica nanotubes, nanotitania, hollow nanoparticles, polymeric nanoparticles or nanofibers such as polyethersulfone nanofibers, polyethersulfone nanospheres, polyetherethersulfone nanofibers, polyetherethersulfone nanospheres, polyetherimide nanofibers, polyimide nanospheres, polyimide nanofibers, polyimide nanofibers, polyamide nanofibres, polyamide nanospheres, elastomeric nanospheres, polyaryletherketones (PAEK) nanofibers, polyaryletherketones nanospheres, polyphenylene sulfide nanofibers, polyamideimide nanofibers, liquid crystal polymers nanofibers.

The conductive nano-particles may be of any suitable shape and morphology and may have a high specific surface area such as flakes, powders, fibres, spheres, dendrites, discs or any other tri-dimensional body with a nanometric dimension, singly or in combination. In some embodiments, the conductive nano-particles may have a specific surface area (SSA) of at least 0.1 $m^2/g$, preferably 10 $m^2/g$ or higher, for example from about 10 $m^2/g$ to about 500 $m^2/g$ as measured by standard Brunauer-Emmett-Tellermethod (BET) measurement method. For example the BET measurement method with a Micro-meritics TriStar II with the standard nitrogen system may be used.

The conductive nano-particles for the intended purposes herein may be present in the range of about 0.1 wt % to about 10 wt % of the total resin content in the composite material. In one embodiment, the conductive nano-particles are carbon nanotubes (CNTs), which are present in an amount in the range about 0.5 wt % to about 2.0 wt % of the total resin content. In another embodiment, the conductive nano-particles are carbon black (CB), which are present in an amount in the range about 1.0 wt % to about 6.0 wt % of the total resin content. As used herein, "wt %" refers to percentage by weight.

Carbon Veil

The carbon veil is a light-weight, nonwoven veil of randomly-arranged fibers having an areal weight from about 1 gsm ($g/m^2$) to about 30 gsm, including from about 2 gsm to about 10 gsm, and in some embodiments, from about 2 gsm to about 6 gsm.

The fibers of the veil are carbon fibers, which may be metal-coated. Metal coating may be of any suitable metal including, but are not limited to, silver, gold, platinum, palladium, nickel, copper, lead, tin, aluminum, titanium, alloys and mixtures thereof.

The nonwoven veil is composed of intermingled, randomly arranged fibers and a small amount of polymeric binder for holding the fibers together. It is desirable to provide a nonwoven veil having a sufficient amount of binder to hold the fibers together but the binder amount is small enough to leave the resulting veil permeable/porous to fluids such as liquid resin. To that end, the amount of binder is less than 30 wt % based on the total weight of the veil. Typical binders include poly vinyl alcohol (PVA), polyester, polyester, styrene acrylic, vinyl-acrylic, epoxy, phenoxy, polyurethanes, polyamides, acrylates, hybrids and copolymers thereof. An example of a suitable carbon veil is Optiveil™ supplied by Technical Fiber Products Ltd. (TFP, U.K.).

In some embodiments, the nonwoven veil is flexible and is self-supporting, meaning that it does not require a supporting carrier. Furthermore, the nonwoven veil is a single-layer material, which is not attached to another layer of fibers. The fibers of the nonwoven veil may be chopped or continuous fiber filaments or combination thereof.

The majority of the nonwoven fibers in the veil may have cross-section diameters in the range of about 0.01 to about 15 micron. In some embodiments, the major portion of the fibers is in the range of about 4 to about 7 micron in diameter.

The nonwoven carbon veil discussed above may be produced by a conventional wet-laid process, as an example. In a wet-laid process, wet chopped fibers are dispersed in a water slurry that contains binder(s), and other chemical agents such as surfactant(s), viscosity modifier(s), defoaming agent(s), etc. Once the chopped fibers are introduced into the slurry, the slurry is intensely agitated so that the fibers become dispersed. The slurry containing the fibers is deposited onto a moving screen where a substantial portion of the water is removed to form a web. Optionally, a liquid binder is then applied to the web. The resulting veil is dried to remove any remaining water, and if necessary, to cure the binder(s). The resulting non-woven veil is an assembly of dispersed, individual fiber filaments arranged in random orientation. Wet-laid processes are typically used when a uniform distribution of fibers and/or weight is desired.

In one embodiment, the carbon veil is metallized with a thin layer of metal on at least one side as described in the published U.S. patent application with US Pub. No. 2011/10159764, which is incorporated herein by reference. Alternatively, any other state of the art metallization processes may be also used to produce the metal-coated veil including physical deposition such as sputtering, sintering, and electrolytic deposition. In one embodiment, the metal-coated carbon veil has an areal weight of from about 2 gsm to about 30 gsm, or from about 2 gsm to about 15 gsm, and a metal content of from about 5% to about 50% or from about 10% to about 70% by weight based on the total weight of the veil.

Polymeric Toughening Particles

The polymeric toughening particles that are suitable for the purposes herein include thermoplastic or elastomeric particles. These polymeric toughening particles do not have a conductive coating such as metal.

In some embodiments, the polymeric toughening particles include particles that are substantially insoluble in the thermoset matrix resin of the composite materials during curing thereof, and remain as discreet particles in the cured matrix resin after curing. In certain embodiments, the insoluble polymeric particles are also swellable particles in the thermoset matrix resin of the composite material during curing. As discussed above, the insoluble polymeric particles may be used in combination with soluble thermoplastic particles as an additional toughening agent.

In some embodiments, the toughening particles are uniformly dispersed in the interlaminar region formed between adjacent layers of reinforcing fibers at a content of about 2% to about 20% by weight based on the total weight of the matrix resin contained in the composite material, including about 5% to about 15%, and about 8% to about 12%.

The polymeric toughening particles may be of any three-dimensional shape, and in some embodiments, they are substantially spherical. In some embodiments, the toughening particles have an aspect ratio of less than 5:1, for example, the aspect ratio may be about 1:1. With reference to toughening particles, the term "aspect ratio" refers to the ratio of the largest cross sectional dimension of the particle to the smallest cross sectional dimension of the particle.

For spherical particles (with aspect ratio of approximately 1:1), the mean particle size refers to its diameter. For non-spherical particles, the mean particle size refers to the largest cross sectional dimension of the particles.

For the purposes disclosed herein, the polymeric toughening particles may have a mean particle size (d50) of less than about 100 μm, for example, within the range of about 10 μm to about 50 μm, or within the range of about 15 μm to about 30 μm. The mean particle sizes as disclosed herein can be measured by a laser diffraction technique, for example, using Malvern Mastersizer 2000 which operates in the 0.002 nanometer-2000 micron range. "d50" represents the median of the particle size distribution, or alternatively is the value on the distribution such that 50% of the particles have a particle size of this value or less.

In some embodiments, the polymeric toughening particles are larger in size as compared to the conductive nano-particles. For example, the mean particle size (d50) of the polymeric toughening particles may be at least 100 times greater than the smallest dimension of the conductive nano-particles.

As an example, when the conductive nano-particles are carbon nanotubes, the mean particle size (d50) of the toughening particle is at least 100 times greater than the diameter of the carbon nanotubes, or 1000 times greater.

Determining whether certain particles are insoluble or soluble relates to the solubility of the particles in a particular resin system in which they reside. The resin system may include one or more thermoset resins, curing agents and/or catalysts, and minor amounts of optional additives for modifying the properties of the uncured or cured matrix resin.

Hot stage microscopy can be used to determine if a particle is insoluble, partially soluble, or swellable in a resin system. First, a sample of dry polymeric particles (which are not combined with a resin) is characterized by microscopy and the images analyzed using ImageJ software from the National Institutes of Health (Bethesda, Md., USA) to determine the average particle size and volume. Second, a sample of particles is dispersed in the desired matrix resin via mechanical mixing. Third, a sample of the resulting mixture is placed on a microscope slide, which is then placed in a hot stage setup under a microscope. Then, the sample is heated to the desired cure temperature at the desired ramp rate, and any change in size, volume or shape of the particles is continuously recorded at 10 frames per second. The diameter is normally measured for spherical particle while the longest side is measured in case of non-spherical ones to determine changes in size and volume using the Image J software. All hot stage testing may be carried out at a particle loading of 10 wt % in a matrix resin containing no curative or catalyst.

When toughening particles are subjected to the above hot stage microscopy analysis and the change in diameter or volume of the particle is zero or less than 5%, as compared to the original "dry" particles, then the particle is considered to be insoluble, and not swellable. When the toughening particle is subjected to the above hot stage microscopy analysis and there is an increase in diameter or volume of the particle by more than 5%, then the particle is considered to be "swellable" as well as insoluble. The swelling is caused by the infusion of the surrounding resin into the outer surface of the particle.

In some embodiments, insoluble particles include particles that melt during the hot stage microscopy analysis but are incompatible with the matrix resin, and therefore reform into discrete particles upon cooling. For analytical purposes only, the insoluble particles may flow during the hot stage microscopy analysis and the degree of crystallinity may also change.

In cases where the diameter or volume may be difficult to determine, an alternate analysis may be used. A 16-ply quasi-isotropic composite panel made from unidirectional prepreg tapes and containing a particle loading of 10% based on the weight of the total matrix resin in the resin-rich interlaminar regions may be manufactured according to a cure schedule, and then the cured panel is cut cross-sectionally for evaluation by microscopy. If the particles remain as discernable, discrete particle after curing, then the particles are considered to be insoluble particles. If the particles fully dissolve into both the interlaminar region and the matrix surrounding the fiber bed, and are not discernable as discrete particles upon cooling, then the particles are not considered insoluble interlaminar particles.

For epoxy-based matrix resin, the composition of insoluble polymeric particles may contain at least one polymer selected from: aliphatic polyamides (PA), cycloaliphatic polyamides, aromatic polyamides, polyphthalamide (PPA), polyaryletherketones (PAEK), such as polyetheretherketone (PEEK) and polyetherketoneketone (PEKK), polyphenylene sulfide (PPS), polyamideimide, liquid crystal polymers (LCPs), copolymers thereof, and derivatives thereof. In some embodiments, the composition of the polymeric particles contains at least one elastomeric polymer or material selected from: cross-linked polybutadiene, polyacrylic, polyacrylonitrile, polystyrene, copolymers thereof, and derivatives thereof (e.g., DuoMod DP5045 sold by Zeon Chemicals Inc.).

In some embodiments, the insoluble particles are insoluble thermoplastic particles that do not dissolve during the curing process and remain as discreet particles within the interlaminar regions of the cured composite material. Examples of suitable insoluble thermoplastic particles include polyamideimide (PAI) particles and polyamide (PA) particles (e.g. nylon), and polyphthalamide (PPA) particles, which are insoluble in epoxy resin system during the curing cycle thereof.

Certain grades of polyimide particles may be suitable as insoluble toughening particles. For example, polyimides prepared from benzophenone tetracarboxylic acid dianhydride (BTDA), 4,4'-methylenedianiline (MDA), and 2,4-toluenediamine (TDA), and having a non-phthalimide carbon content which contains between 90 and 92 percent aromatic carbons.

Insoluble thermoplastic particles have been found to be effective as interlaminar tougheners for avoiding the loss of hot/wet performance. Because these thermoplastic particles remain insoluble in a matrix resin even after curing, they impart improved toughness, damage tolerance, hot/wet performance, processing, micro-cracking resistance, and reduced solvent sensitivity to the cured resin.

The method of manufacturing the insoluble particles described herein may include, in any order, emulsification, precipitation, emulsion polymerization, washing, drying, extrusion, milling, grinding, cryo-grinding, jet milling and/or sieving the particles. Those skilled in the art will appreciate that these steps can be achieved by any of numerous methods known in the art.

The insoluble particles used for the intended purposes herein include cross-linked thermoplastic particles. According to one embodiment, the cross-linked thermoplastic particle is composed of a crosslinking network created by reacting one or more crosslinkable thermoplastic polymers having one or more reactive groups with a crosslinking agent that is chemically reactive to the reactive groups, wherein the crosslinking agent directly crosslinks the polymer chains to each other via the reactive groups. The reactive groups may be end groups or pendant groups on the polymer backbone. The direct crosslinking reaction of this embodiment may be described as "tying-up" the polymer molecules via direct crosslinking of the polymer chains using one or more reactive groups.

The above crosslinked thermoplastic particles may be produced by the process described in U.S. Patent Application with Publication No. 2010/0304118, published on Dec. 2, 2010, which is incorporated herein by reference. This method includes dissolving a thermoplastic polymer with reactive functional groups, a crosslinking agent, and a catalyst into a common solvent, which is immiscible with water. An emulsion is then created in water by using a non-ionic surfactant, whereby emulsified particles are formed. The emulsified particles are subsequently dried and cured so that the polymeric chains become chemically crosslinked. The reacting conditions and the type of cross-linking agent will determine the final properties of the particles. Reacting conditions such as temperature result in greater crosslinking. Crosslinking agents with two or more reactive sites (i.e. functional groups) are preferred. The resulting crosslinked thermoplastic particles are discreet, free-moving particles that may be added to a curable resin. These crosslinked thermoplastic particles are also swellable in the curable resin during curing.

Examples of suitable thermoplastic polymers bearing reactive groups that are susceptible to crosslinking include, but are not limited to, one or more of a polyether, polycarbonate, polyetherimide (PEI), polyamide, polyimide, polysulfone, polyethersulfone (PES), poly phenylene oxide (PPO), poly ether ketones, polyaryletherketones (PAEK) such as polyetheretherketone (PEEK) and polyetherketoneketone (PEKK), polyphenyl sulfides (PPS), polyhydroxyethers, styrene-butadiene, polyacrylates, polyacetol, polybutyleneterephthalate, polyamide-imide, polyetherthersulfone (PEES), blends thereof, or a copolymer thereof, PES homopolymers (such as SUMIKAEXCEL 5003P from Sumitomo Chemical Co. or Radel® PES from Solvay), or PEES homopolymers. Specific examples of PES copolymers include PES/PEES copolymer with various repeat unit ratios. The thermoplastics listed above can be used as a single component to form a particle, or, when more than one thermoplastic polymer is used, a hybrid structure, or a hybrid particle, is formed.

In other embodiments, the crosslinked thermoplastic particles are formed from a blend of thermoplastic polymers. In still other embodiments, the crosslinked particles described herein may be formed from a hybrid structure wherein two or more thermoplastic polymers are used.

The reactive groups on crosslinkable thermoplastic polymers may be one or more of the following: amine; hydroxyl; anhydride; glycidyl; carboxylic acid; maleimide; isocyanate; phenolic; nadimide; cyanate ester; acetylene; vinyl; vinyl ester; diene; or derivatives thereof. In some cases, unsaturations on the polymer chain might serve as cross-linking points (for acrylic and methacrylic family as well some insaturated rubbers, vinyl esters or unsaturated polyesters). The number of reactive groups may be a minimum of one reactive group per chain and, in some embodiments, is considered as the lowest fraction necessary to create a connected polymer backbone; a number around or greater than one is preferred to produce a tightly cross-linked polymer or inter-penetrating network. Polymers with functionalities greater than 2 will easily produce highly reacted gels.

Depending on the chemical nature of the thermoplastic polymer's end groups/functionalities, an appropriate multifunctional crosslinking agent with multiple reactive sites may be selected. Examples of such crosslinking agents are: alkylated melamine derivatives (e.g. CYMEL® 303), acid chlorides (e.g. 1,3,5 benzenetricarbonyl trichloride), multi-functional epoxies (e.g. ARALDITE® MY0500, MY721), carboxylic acids (e.g. benzenetetracarboxylic acid).

In another embodiment, the crosslinked thermoplastic particle is composed of an inter-penetrating polymer network (IPN), which is composed of thermoplastic polymer chains intertwined with an independent crosslinking network. The IPN is created by reacting one or more compounds (e.g. crosslinkable monomers or polymers) having one or more reactive groups with a cross-linking agent that is chemically reactive to the reactive groups in the presence of a thermoplastic polymer. The reaction (which occurs under certain crosslinking or curing conditions) causes the compounds to become cross-linked via the reactive groups, thereby forming an independent cross-linking network. As such, the thermoplastic polymer chains are intertwined with the independent cross-linking network at a molecular level to form an IPN. This approach may be described as "tying-up" the thermoplastic polymer chains via the formation of a separate and independent crosslinking network, thereby creating an inter-penetrating network. Thus, in this embodiment, the thermoplastic polymer does not need to have reactive groups thereon. This type of crosslinked particles may be produced by the process described in U.S. Pat. No. 8,846,818, the content of which is incorporated herein by reference. The resulting crosslinked thermoplastic particles are discreet particles that may be added to a curable resin. These crosslinked thermoplastic particles are also swellable in the curable resin during curing.

As an example, a crosslinked particle with an IPN may be created by: (i) forming an emulsion containing a thermoplastic polymer, a multifunctional epoxy resin and an amine curing agent capable of cross-linking the epoxy resin; (ii) removing the solvent from the emulsion and collecting the condensate, which is in the form of solid particles; (iii) drying the particles followed by curing (e.g. by heating) so that the epoxy resin becomes cross-linked. As a result of curing, the cross-linked epoxy forms an IPN with the thermoplastic polymer in each particle.

The swellable, crosslinked thermoplastic particles also form a "gradient interface" with the surrounding matrix resin in which they reside during curing. The term "gradient interface" as used herein refers to the gradual and strong interface between each of the particles and the surrounding matrix resin. A gradient interface is achieved by using engineered crosslinked thermoplastic particles that are thermodynamically compatible with the thermoset resin, e.g. epoxy. The concentration of thermoplastic polymer in the core of a crosslinked thermoplastic particle is greatest at the center and gradually decreases towards the outer surface of the particle as the matrix resin enters the particle from the outer surface and moves towards the core. This gradual decrease in the thermoplastic concentration from the core to the outer surface of the thermoplastic particle forms the gradient interface between each of the thermoplastic particles and the surrounding matrix resin. Thus, there is no sharp delineation or transition between the thermosetting resin and the thermoplastic particle. If a sharp delineation or transition was present, the interface between the thermoplastic and the thermosetting resin would be much weaker in a composite material in comparison to a composite material containing a gradient interface. As such, these crosslinked thermoplastic particles are considered "swellable" because the resin, which surrounds the particle, diffuses into the particles through the particle's outer surface when the resin is heated and its viscosity is reduced, thereby resulting in an increase in the particle size. However, the crosslinked particles will remain as discrete and discernable particles after curing of the resin.

The crosslinked thermoplastic particles described herein are discreet, free-moving particles (i.e. in divided state) that may be added to a thermosettable resin, such as an epoxy-based resin, and they are chemically cross-linked in order to prevent their total dissolution in the resin during the cure cycle of the resin. Furthermore, they are designed to be thermodynamically compatible with the thermoset resin.

"Discrete particle" as used herein refers to a particle which is discernible in a matrix resin, and which may be detected by using Scanning Electron Microscopy (SEM), Optical Microscopy, or Differential Interference Contrast microscopy (DIC).

When used, soluble thermoplastic particles include particulate thermoplastic polymers selected from: polyarylsulfones, e.g. polyethersulfone (PES), polyetherethersulfone (PEES), polyetherimide (PEI) and polyimides (PI). As mentioned previously, these soluble thermoplastic particles are solid particles (e.g. powder) that dissolve into the surrounding resin matrix when the mixture thereof is heated or during the curing cycle of the matrix resin, and do not remain as discreet particles in the cured matrix resin. As used herein, "dissolves" into the surrounding resin means forming a homogeneous or continuous phase with the resin.

Matrix Resin

The curable matrix resin (or resin composition) for impregnating/infusing the reinforcement fibers is a hardenable or thermosettable resin containing one or more uncured thermoset resins, which include, but are not limited to, epoxy resins, imides (such as polyimide and bismaleimide), vinyl ester resins, cyanate ester resins, isocyanate modified epoxy resins, phenolic resins, benzoxazines, formaldehyde condensate resins (such as urea, melamine and phenol), unsaturated polyesters, hybrids, blends and combinations thereof.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the matrix resin include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials such as 2,2-bis(4,4'-dihydroxy phenyl) propane (e.g. DER 661 from Dow, or EPON 828 from Momentive, and Novolac resins preferably of viscosity 8-20 Pa·s at 25° C.; glycidyl ethers of phenol Novolac resins (e.g. DEN 431 or DEN 438 from Dow); di-cyclopentadiene-based phenolic novolac (e.g. Tactix 556 from Huntsman); diglycidyl 1,2-phthalate (e.g. GLY CEL A-100); diglycidyl derivative of dihydroxy diphenyl methane (Bisphenol F) (e.g. PY 306 from Huntsman). Other suitable epoxy resins include cycloaliphatics such as 3',4'-epoxycyclohexyl-3,4-epoxycyclohexane carboxylate (e.g. CY 179 from Huntsman).

Generally, the curable matrix resin contains one or more thermoset resins, and may be in combination with other additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, and other additives well known to those skilled in the art for modifying the properties of the matrix resin before or after curing.

Suitable toughening agents for the curable matrix resin composition include but are not limited to homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyetherethersulfones (PEES), polyesters, polyurethanes, polysulphones, polysulphides, polyphenylene oxide (PPO) and modified PPO, poly(ethylene oxide) (PEO) and polypropylene oxide, polystyrenes, polybutadienes, polyacrylates, polymethacrylates, polyacrylics, polyphenylsulfone, high performance hydrocarbon polymers, liquid crystal polymers, elastomers and segmented elastomers.

The addition of curing agent(s) and/or catalyst(s) in the curable matrix resin is optional, but the use of such may increase the cure rate and/or reduce the cure temperatures, if desired. The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g. Monuron); 3,4-dichlorophenyl-N,N-dimethyl-urea (e.g. DIURON™) and dicyanodiamide (e.g. AMICURE™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

The curable matrix resin at the interlaminar region is also a hardenable or thermosettable resin containing one or more uncured thermoset resins of the type discussed above. In certain embodiments, the curable matrix resin at the interlaminar region is the same as the matrix resin in the region containing the reinforcement fibers. In other embodiments, the resin at the interlaminar region is different from the matrix resin in the region containing the reinforcement fibers.

Reinforcement Fibers

The reinforcement fibers for the purposes herein include carbon or graphite fibers with a high tensile strength, for example, greater than 500 ksi (or 3447 MPa). The reinforcement fibers may be in the form of continuous tows made up of multiple filaments, as continuous unidirectional or multidirectional fibers, as woven fabrics or multiaxial fabrics. Unidirectional fibers refer to fibers that run (or extend) in one direction only. Mutiaxial fabrics include non-crimped fabrics. In some embodiments, the reinforcement fibers are in the form of unidirectional fibers or woven fabric, not a nonwoven layer. Moreover, the carbon fibers may be sized or unsized.

For structural applications, the content of the reinforcement fibers in a prepreg or composite material may be within the range 30% to 70% by volume, in some embodiments, 50% to 70% by volume.

Manufacturing of Composite Prepregs and Laminates

The term "prepreg" as used herein refers to a sheet or layer of fibers that has been impregnated with a curable resin composition within at least a portion of the fibrous volume. The prepreg used for manufacturing aerospace structures is usually a resin-impregnated sheet of uni-directional reinforcing fibers, e.g. carbon fibers, which is often referred to as "tape" or "uni-directional tape". The prepregs may be fully impregnated prepregs or partially impregnated prepregs. The matrix resin impregnating the reinforcement fibers may be in a partially cured or uncured state. The term "impregnated" as used in herein refers to fibers that have been subjected to an impregnation process whereby the fibers are at least partially surrounded by or embedded in a matrix resin.

Typically, the prepreg is in a pliable or flexible form that is ready for laying up and molding into a three-dimensional configuration, followed by curing into a final composite part/structure. This type of prepregs is particularly suitable for manufacturing load-bearing structural parts, such as wings, fuselages, bulkheads and control surfaces of aircrafts. Important properties of the cured prepregs are high strength and stiffness with reduced weight.

To form a composite structure, a plurality of prepreg plies may be laid up on a tool in a stacking sequence to form a "prepreg lay-up." The prepreg plies within the layup may be positioned in a selected orientation with respect to one another, e.g. 0°, ±45°, 90°, etc. Prepreg lay-ups may be manufactured by techniques that may include, but are not limited to, hand lay-up, automated tape layup (ATL), advanced fiber placement (AFP), and filament winding.

According to one embodiment, specific amounts of conductive nano-particles and polymeric toughening particles are mixed with a curable resin composition prior to the impregnation of carbon reinforcement fibers (i.e. prior to the prepreg manufacturing). In this embodiment, a resin film is manufactured first by coating the particle-containing resin composition onto a release paper. Next, one or two of such resin film is/are laminated onto one or both sides of a layer of carbon fibers under the aid of heat and pressure to impregnate the fibers, thereby forming a resin-impregnated fiber layer (or prepreg ply) with specific fiber areal weight and resin content. During the laminating process, the toughening particles are filtered out and remain external to the fiber layer due to the fact that the size of the particles is larger than the spacing between the fiber filaments. Subsequently, two or more prepreg plies containing toughening particles therein are laid up one on top of the other to form a composite layup with placement of a nonwoven carbon veil between adjacent prepreg plies. As the result of the layup process, the polymeric toughening particles and the carbon veil are positioned in the interlaminar region between two adjacent carbon fiber layers. When the layup is consolidated with the application of pressure, at least some polymeric toughening particles and at least some conductive nano-particles penetrate through the carbon veil due to the thickness and porous characteristics of the carbon veil. Upon curing, the carbon veil becomes embedded in the matrix resin at the interlaminar region. In this embodiment, the matrix resin at the interlaminar region is the same as the matrix resin impregnating the reinforcement fibers, and the conductive nano-particles are uniformly dispersed throughout the matrix resin.

Figure 4:
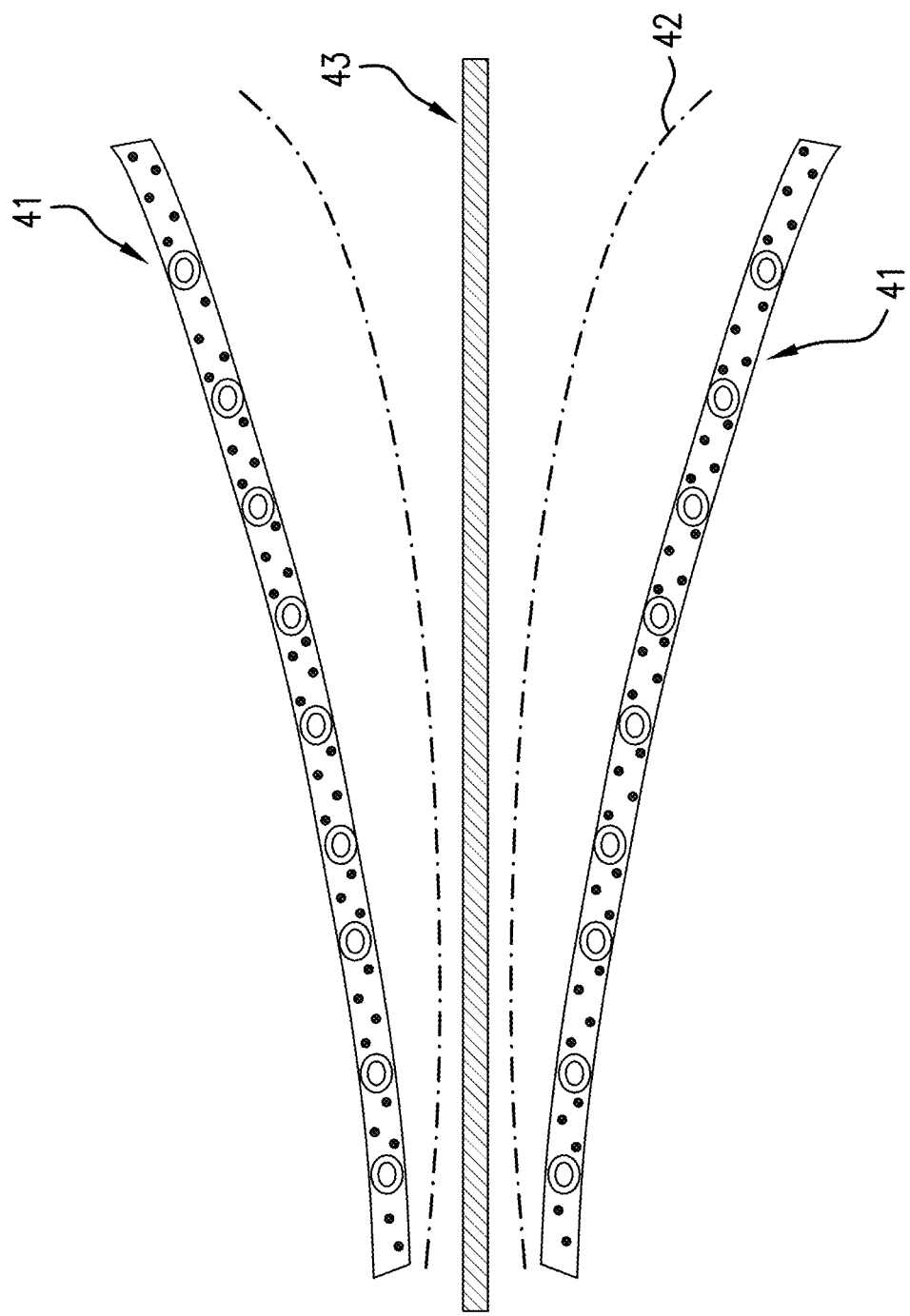
FIG. 4 schematically illustrates a particle-containing resin film and a carbon veil being laminated onto each side of a carbon fiber layer, according to an embodiment of the present disclosure.

In another embodiment, which is schematically illustrated in FIG. 4, a curable resin film 41, which contains conductive nano-particles and polymeric toughening particles, and a carbon veil 42 are laminated onto each side of a carbon fiber layer 43 such that the veil 42 is sandwiched between each resin film 41 and the carbon fiber layer 43. Lamination is carried out under the aid of heat and pressure to impregnate the fibers, thereby forming a prepreg ply with specific fiber areal weight and resin content. During the laminating process, the polymeric particles are filtered out and remain external to the carbon fiber layer, and at least some polymeric particles and at least some conductive nanoparticles penetrate through the veil. A plurality of such prepreg plies are laid up to form a composite laminate with carbon veils, conductive nano-particles and polymeric particles embedded in the interlaminar regions.

In an alternative embodiment, the method described with reference to FIG. 4 is modified so that the curable resin film 41 contains dispersed conductive nanoparticles, but not polymeric toughening particles. The resulting composite laminate then contains carbon veils and conductive nano-particles embedded in the interlaminar regions.

According to a further embodiment, specific amounts of conductive nano-particles are mixed with a curable resin composition prior to the impregnation of carbon reinforcement fibers (i.e. prior to the prepreg manufacturing). In this embodiment, a resin film is manufactured first by coating the particle-containing resin composition onto a release paper. Next, one or two of such resin film is/are laminated onto one or both sides of a layer of carbon fibers under the aid of heat and pressure to impregnate the fibers, thereby forming a resin-impregnated fiber layer (or prepreg ply) with specific fiber areal weight and resin content. Subsequently, two or more prepreg plies are laid up, one on top of the other, to form a composite layup with placement of a nonwoven carbon veil between adjacent prepreg plies. As the result of the layup process, the carbon veil is positioned in the interlaminar region between two adjacent carbon fiber layers. When the layup is consolidated, at least some conductive nano-particles penetrate through the carbon veil due to the thickness and porous characteristics of the carbon veil. Upon curing, the carbon veil becomes embedded in the matrix resin at the interlaminar region. In this embodiment, the matrix resin at the interlaminar region is the same as the matrix resin impregnating the reinforcement fibers, and the conductive nano-particles are uniformly dispersed throughout the matrix resin.

Curing of the composite material or prepreg layup disclosed herein may be carried out at elevated temperatures of up to about 200° C., for example, in the range of about 170° C. to about 190° C., and optionally, with application of elevated pressure to restrain deforming effects of escaping gases, or to restrain void formation. Suitable pressure may be up to 10 bar (1 MPa), for example, in the range of about 3 bar (0.3 MPa) to about 7 bar (0.7 MPa). In some embodiments, the cure temperature is attained by heating at up to 5° C./min, for example, 2° C./min to 3° C./min and is maintained for the required period of up to 9 h, or up to 6 h, for example, between 2 h and 4 h. The use of a catalyst in the matrix resin may allow even lower cure temperatures. Pressure may be released throughout, and temperature may be reduced by cooling at up to about 5° C./min, for example, up to 3° C./min. Post-curing at temperatures in the range of 190° C. to 350° C. and atmospheric pressure may be performed, employing suitable heating rates to improve the glass transition temperature of the matrix resin.

Applications

The resin compositions described herein can be used to manufacture cast or moulded structural materials, and are particularly suitable for fabrication of fiber-reinforced load-bearing or impact-resisting composite structures with improved volume electrical conductivity.

The composite materials disclosed herein are applicable to the manufacture of components for transport applications, including aerospace, aeronautical, nautical and land vehicles, automotive, and railroad. For examples, the composite materials may be used for fabricating primary and secondary aircraft structures, space and ballistics structures. Such structural components include composite wing structures. The composite materials disclosed herein also find utility in building and construction applications, as well as other commercial applications. Notably, the composite materials are particularly suitable for the fabrication of load-bearing or impact-resisting structures.

EXAMPLES

Measurement Methods

Composite samples manufactured in the following Examples were tested according to the following procedures for measuring the z-direction electrical conductivity and mechanical properties.

Electrical Conductivity Measurements

Test sample's dimensions and tolerances are defined in Table 1.

TABLE 1

| Conductivity coupons dimension | |
|---|---|
| Length (L) | 1.0 inch |
| Width (w) | 1.0 inch |
| Thickness (t) | 0.110 inch |

Sample's surfaces were polished to remove the resin excess; then silver paste was used to create two electrodes on the opposite surfaces. Samples were clamped between two copper plates to reduce contact resistance between the wires and the sample surfaces.

Z-direction DC electrical conductivity was determined using the Keithley 6221/2182A DELTA MODE system according to the 4-probes Volt-amperometric measurement method.

Test samples (1 inch×1 inch) were prepared and tested by applying 10 mA current. Potential voltage values between the electrodes were recorded after stabilizing the current within 2%. Z-direction resistivity and conductivity were calculated according to the following formulas:

Resistivity $(\rho)[ohm-m] = (V/I)/t \cdot A$

Conductivity $(\sigma)(S/m) = 1/\rho$ where:
V=potential voltage (volts)
I=forced current (amperes)
T=thickness of the sample which is the z dimension (m)
A=cross-sectional area which is X by Y dimensions (m$^2$)

Measurements were performed at 25° C. in standard humidity conditions. Average and corresponding standard deviation results were reported.

Mechanical Characterization

Tests for measuring mechanical performance were performed in accordance with the methods reported in Table 2.

TABLE 2

| Mechanical Tests and Corresponding Test Method | | | | | |
|---|---|---|---|---|---|
| Property | Conditioning | Testing temperature | Lay-up | Unit measure | Standard |
| CAI 230 in-lbs | — | RT | [+/0/−/90]3s | Ksi | ASTM-D7136 and |
| CAI 270 in-lbs | — | RT | [+/0/−/90]3s | Ksi | ASTM-D7137 |
| $G_{IC}$ - DCB | — | RT | [0]$_{20}$ | in-lb/in$^2$ | ASTM-D5528 |
|  | 2 week water soak @160° F. | 70° C. (158° F.) | [0]$_{20}$ | in-lb/in$^2$ |  |
| Open Hole Tension (OHT) | — | RT | [+/90/−/0]$_{2S}$ | Ksi | ASTM-D5766 |
|  | — | −59° C. (−75° F.) | [+/90/−/0]$_{2S}$ | Ksi |  |
| Open Hole Compression (OHC) | — | RT dry | [+/90/−/0]$_{2S}$ | Ksi | ASTM-D6484 |
|  | 2 week water soak @160° F. | 82° C. (180° F.) | [+/90/−/0]$_{2S}$ | Ksi |  |
| In-plane Shear modulus (IPSM) | — | RT | [+45/−45]$_s$ | Msi | ASTM-D3518 |
|  | Soak in MEK | RT | [+45/−45]$_s$ | Msi |  |
|  | Soak in Water | RT | [+45/−45]$_s$ | Msi |  |

RT in Table 2 denotes room temperature.

Example 1

Four different resin compositions were prepared based on the formulations disclosed in Table 3. Control 1.1 and Control 2.1 are two baseline resin systems with and without interlaminar particles, and Resin 1.0 and Resin 2.0 are two MWCNT-modified versions thereof. The compositions are reported in weight by weight (w/w) percentages.

TABLE 3

Resin Compositions

| Components | Resin code | | | |
|---|---|---|---|---|
| | Resin 1.0 | Resin 2.0 | Control Resin 1.1 | Control Resin 2.1 |
| Araldite ® PY306 | 26.00 | 22.93 | 26.74 | 22.93 |
| Araldite ® MY0510 | 26.00 | 22.93 | 26.74 | 22.93 |
| SUMIKAEXCEL 5003P | 19.46 | 17.15 | 19.44 | 17.15 |
| MWCNT | 1.45 | 1.27 | — | — |
| TGP3551 | — | 3.69 | — | 3.69 |
| Crosslinked TP particles | — | 3.69 | — | 3.69 |
| P84 | — | 4.62 | — | 4.62 |
| 4,4'DDS | 27.09 | 23.89 | 27.08 | 23.89 |

Araldite® PY306 is a Bisphenol F diglycidyl ether resin available from Huntsman, Araldite® MY0510 is a triglycidyl ether of p-aminophenol resin available from Huntsman, SUMIKAEXCEL 5003P is a polyethersulfone polymer available from Sumitomo Chemical Co., MWCNT refers to multi-walled carbon nanotubes having an average diameter of 15 nm, and an average length of about 1 mm, TGP3551 refers to Vestasint® TGP3551 a polyamide powder from Evonik which is insoluble upon curing, P84 particles are aromatic polyimide particles from Evonik with an average particle size distribution d50 of 44 microns, which swell and solubilize into the resin upon curing, crosslinked TP particles are particles of cross-linked PES-PEES with a mean particle size of 25 microns from Cytec Industries Inc., and 4,4'DDS refers to 4,4'-diaminodiphenylsulphone.

The predetermined amount of MWCNT was dispersed in the epoxy resin mixture. Then the remaining components were added to the master-batch and mixed until a homogeneous mixture was obtained.

The resin compositions were then used to produce four different unidirectional (UD) prepregs using a hot melt impregnation process. The resin films were produced by coating the resin composition onto a release paper. Next, two of such resin films were laminated onto both sides of a continuous layer of unidirectional carbon fibers (IM65E from Toho Tenax, USA), under the aid of heat and pressure, to form a prepreg. The characteristics of the prepregs are shown in Table 4. Percentage (%) shown is weight percentage.

TABLE 4

| Prepregs | | | | | |
|---|---|---|---|---|---|
| Prepreg code | Resin code | MWCNT (%) | Interlaminar particles (%) | FAW (gsm) | Resin Content (%) |
| 3.0 | 1.0 | 1.2 | 0 | 187.97 | 28.87 |
| 4.0 | 2.0 | 1.2 | 12 | 189.68 | 31.15 |

TABLE 4-continued

| Prepregs | | | | | |
|---|---|---|---|---|---|
| Prepreg code | Resin code | MWCNT (%) | Interlaminar particles (%) | FAW (gsm) | Resin Content (%) |
| Control 3.1 | Control 1.1 | 0 | 0 | 191.75 | 32.05 |
| Control 4.1 | Control 2.1 | 0 | 12 | 191.50 | 33.22 |

Composite laminates were manufactured by laying up the prepregs to form lay-ups with quasi-isotropic configuration (each layup being about 0.110 inch thick) followed by consolidation and curing in an autoclave for 2 hours at 177° C. Some laminates were produced according to the same procedure but a single 4 gsm nonwoven carbon veil was pressed onto one side of the prepreg prior to laying up so that the carbon veil was an interleaf between two adjacent prepregs.

Each nonwoven carbon veil was composed of intermediate modulus carbon fibers, and was manufactured using a wet laid (i.e. paper-making) process and an emulsion of epoxy-urethane copolymer as the binder. The carbon veil was very thin and porous such that the thermoplastic particles, when present, penetrated through the veil during consolidation of the layups.

The z-direction electrical conductivity of the cured laminates was measured and the results are reported in Table 5. Percentage (%) shown is weight percentage.

TABLE 5

| Z-direction Conductivity Results | | | | | |
|---|---|---|---|---|---|
| Laminate code | Prepreg code | MWCNT (%) | Veil (gsm) | Interlaminar particles | Conductivity (S/m) |
| Control 5.0 | Control 3.1 | 0 | — | NO | 0.77 ± 0.20 |
| Control 6.0 | Control 4.1 | 0 | — | YES | 0.07 ± 0.01 |
| 5.1 | 3.0 | 1.2 | — | NO | 15.30 ± 0.85 |
| 6.1 | 4.0 | 1.2 | — | YES | 5.54 ± 0.27 |
| 5.2 | 3.1 | 0 | 4 | NO | 8.01 ± 0.63 |
| 6.2 | 4.1 | 0 | 4 | YES | 11.07 ± 1.66 |
| 5.3 | 3.0 | 1.2 | 4 | NO | 65.22 ± 3.85 |
| 6.3 | 4.0 | 1.2 | 4 | YES | 31.46 ± 2.87 |

The results demonstrate that the combination of carbon nanotubes and carbon veil can yield improvements in the z-direction conductivity of the cured laminates well above what would be expected by summing the conductivity values obtained for resin systems modified by only one of the two carbon materials separately.

Figure 5:
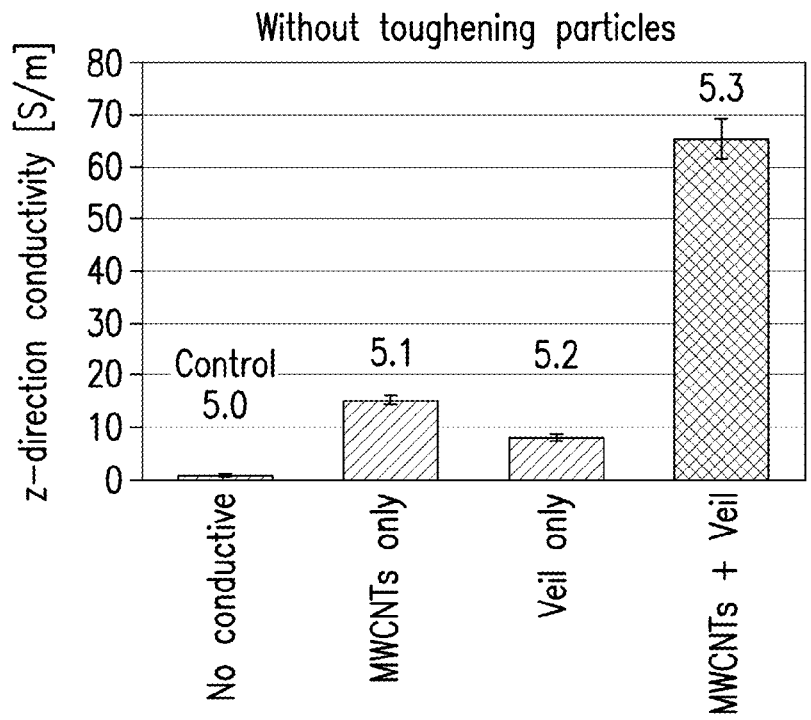
FIG. 5 is a graphic summary of electrical conductivity data for various composite laminates, showing the synergistic effect of multi-walled carbon nanotubes (MWCNT) and carbon veil without toughening particles.

For laminates without interlaminar toughening particles, Laminate 5.3 has a z-direction conductivity value of 65.22 S/m, which is much greater than the sum of conductivity values of Laminate 5.1 with MWCNT only (15.3 S/m) and Laminate 5.2 with carbon veils only (8.01 S/m). FIG. 5 is a graphic summary of the z-direction conductivity results reported in Table 5, showing the synergistic effect of MWCNT and carbon veil without toughening particles.

Figure 6:
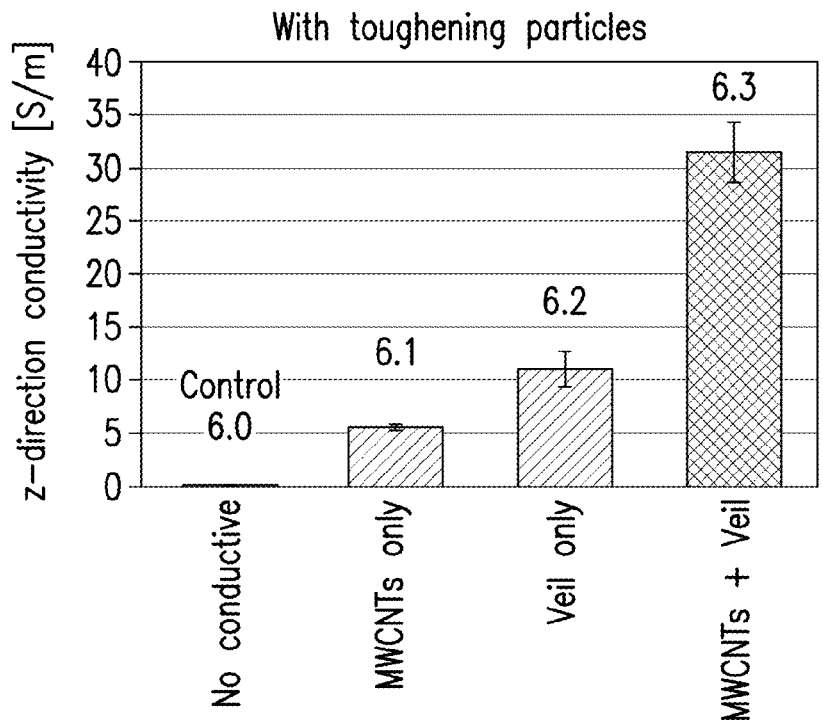
FIG. 6 is a graphic summary of electrical conductivity data for various composite laminates, showing the synergistic effect of MWCNT and carbon veil with toughening particles.

For laminates with interlaminar toughening particles, a z-direction conductivity value of 31.46 S/m was measured for Laminate 6.3. This value is greater than the sum of the conductivity values of Laminate 6.1 with MWCNT only (5.54 S/m) and Laminate 6.2 which contained carbon veils only (11.07 S/m). FIG. 6 is a graphic summary of the z-direction conductivity results reported in Table 5, showing the synergistic effect of MWCNT and carbon veil with the presence of toughening particles.

It is believed that the high conductivity values obtained for Laminates 5.3 and 6.3 are the result synergistic effects between the conductive veil and MWCNT. Such positive interactions are evident in composite materials with and without interlaminar toughening particles. Furthermore, the presence of carbon veil and MWCNT resulted in a well-defined interlaminar region between adjacent layers of structural fibers. This effect also reduced the coefficient of variability (COV) of the electrical measurements.

Example 2

Three different resin compositions were prepared according to the formulations disclosed in Table 6. Compositions are reported in weight by weight (w/w) percentage. Control 7.0 is a baseline particle-toughened resin system; Resin 7.1 and Resin 7.2 are carbon-modified versions thereof. Relatively low concentrations of carbon fillers were selected to produce formulations with a rheological profile suitable for standard prepreg manufacturing processes.

TABLE 6

Resin Compositions (%)

| Components | Resin code | | |
|---|---|---|---|
| | Control 7.0 | Resin 7.1 | Resin 7.2 |
| Araldite ® PY306 | 24.07 | 24.1 | 24.1 |
| Araldite ® MY0510 | 24.07 | 24.1 | 24.1 |
| SUMIKAEXEL 5003P | 16.96 | 17.0 | 17.0 |
| 4,4'DDS | 21.90 | 21.9 | 21.9 |
| Vestamid ® Z2649 | 13.00 | 13.0 | 13.0 |
| Carbon black | — | — | 3.0 |
| MWCNT | — | 0.5 | — |

Vestamid® Z2649 is a polyamide 10,10 powder from Evonik which is insoluble upon curing in the resin system. The carbon black used was Ensaco 250 supplied by Timcal, UK.

The predetermined amount of carbon fillers (MWCNT or carbon black) was first dispersed in the epoxy components. Then the remaining components were added to the masterbatch and mixed until a homogeneous mixture was obtained.

The three resin compositions were then used to produce different unidirectional (UD) prepregs via a hot-melt impregnation process. The characteristics of the prepregs are shown in Table 7.

TABLE 7

Prepregs

| Prepreg code | Resin Code | Optiveil ® (4 gsm) | FAW (gsm) | Resin content (%) |
|---|---|---|---|---|
| Control 8.0 | Control 7.0 | No | 190.30 | 33.25 |
| Control 9.0 | Control 7.0 | Yes | 194.50 | 33.78 |
| 8.1 | 7.1 | No | 190.05 | 33.98 |
| 9.1 | 7.1 | Yes | 194.70 | 34.55 |
| 8.2 | 7.2 | No | 190.31 | 33.59 |
| 9.2 | 7.2 | Yes | 194.33 | 33.64 |

Composite laminates were manufactured by laying up the prepregs to form 0.118 inch-thick layups with quasi isotropic configuration followed by curing in an autoclave for 2 hours at 180° C. Some laminates were produced with a single 4 gsm nonwoven carbon veil (Optiveil® from Technical Fibre Products) as an interleaf between two adjacent prepregs. The z-direction conductivity of the cured laminates was measured and the results are reported in Table 8.

TABLE 8

Z-direction Electrical Results

| Laminate code | Prepreg code | MWCNT | Carbon black | Optiveil ® (4 gsm) | Conductivity (S/m) |
|---|---|---|---|---|---|
| Control 10.0 | 8.0 | No | No | No | 0.05 ± 0.02 |
| Control 11.0 | 9.0 | No | No | Yes | 7.42 ± 0.32 |
| 10.1 | 8.1 | Yes | No | No | 0.57 ± 0.16 |
| 11.1 | 9.1 | Yes | No | Yes | 12.17 ± 0.61 |
| 10.2 | 8.2 | No | Yes | No | 0.26 ± 0.07 |
| 11.2 | 9.2 | No | Yes | Yes | 18.09 ± 0.97 |

It was observed that the addition of relatively low concentrations of carbon nanotubes or carbon black can only yield moderate improvements in the z-direction conductivity of cured laminates as shown for Laminate 10.1 (0.57 S/m) and Laminate 10.2 (0.26 S/m). When only a carbon veil with low areal weight is used to modify a particle toughened prepreg (Control 11.0), some improvement can be achieved (conductivity=7.42 S/m). Notably, when the combination of carbon fillers and carbon veil was used, the improvement in the z-direction conductivity of the cured laminate was well above what would be expected by summing the conductivity value of a laminate modified with carbon fillers only and that of a laminate modified with carbon veil only.

Referring to Table 8, Laminate 11.1 (carbon veil+MWCNT) yielded a z-direction conductivity of 12.17 S/m which is approximately 50% greater than the expected cumulative value (7.99 S/m) of Control 11.0 (veil only) and Laminate 10.1 (MWCNT only).

The same trend was observed for resin systems modified with carbon black. Laminate 11.2 yielded a z-direction electrical conductivity of 18.09 S/m, which is more than double the expected cumulative value (7.68 S/m) of Control 11.0 (veil only) and Laminate 10.2 (carbon black only).

Figure 7:
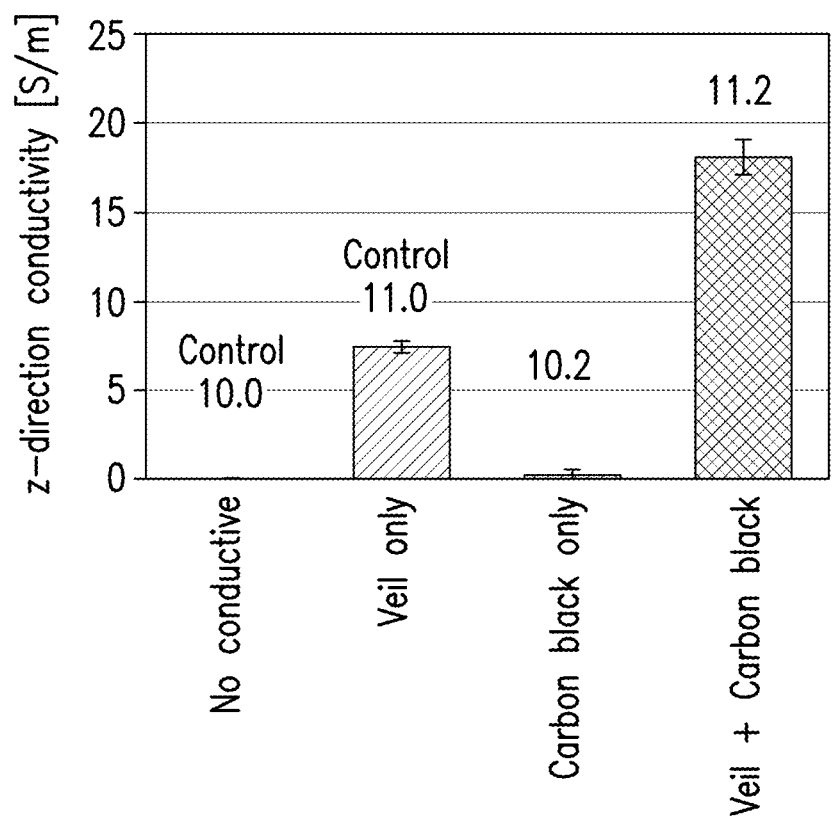
FIG. 7 is a graphic summary of electrical conductivity data for various composite laminates, showing the synergistic effect of carbon black and carbon veil.

FIG. 7 is a graphic summary of the z-direction conductivity results reported in Table 8, showing the synergistic effect of carbon veil and carbon black. It is believed that the high conductivity values measured for Laminates 11.1 and 11.2 are the result of a positive synergy between the lightweight carbon veil and the conductive nanoparticles in the interlaminar region of the cured laminates. The synergy may be the result of an in-situ formation of a conductive nano-network within a conductive carbon fibers micro network upon curing.

Mechanical testing of the cured laminates was carried out and the results are reported in Table 9.

TABLE 9

Mechanical results

| Property | Laminate code | | | | | |
|---|---|---|---|---|---|---|
| | Control 10.0 | Control 11.0 | 10.1 | 11.1 | 10.2 | 11.2 |
| CAI 230 in-lbs (Ksi) | 45.28 | 44.01 | 41.90 | 42.15 | 44.11 | 42.66 |
| CAI 270 in-lbs (Ksi) | 41.59 | 40.24 | 39.25 | 40.32 | 44.61 | 40.32 |
| $G_{IC}$ - DCB (in-lb/in$^2$) | 1.59 | 2.83 | 1.80 | 2.98 | 1.73 | 2.39 |
| OHT @RT (Ksi) | 80.04 | 79.74 | 79.60 | 77.66 | 78.77 | 79.86 |
| OHT @-75° F. (Ksi) | 75.76 | 71.88 | 77.25 | 76.23 | 73.27 | 77.94 |
| OHC @RT (Ksi) | 52.74 | 48.54 | 50.65 | N.A. | 53.75 | 50.68 |
| OHC @180° F. (Ksi) | 36.52 | 36.99 | 37.02 | N.A. | 37.84 | 38.85 |

TABLE 9-continued

Mechanical results

| | Laminate code | | | | | |
|---|---|---|---|---|---|---|
| Property | Control 10.0 | Control 11.0 | 10.1 | 11.1 | 10.2 | 11.2 |
| IPSM @RT (Msi) | 0.70 | 0.75 | 0.66 | 0.74 | 0.63 | 0.75 |
| IPSM$_{(MEK)}$(Msi) | 0.64 | 0.69 | 0.59 | 0.68 | 0.57 | 0.71 |
| IPSS $_{(H2O)}$(Msi) | 0.64 | 0.69 | 0.60 | 0.67 | 0.58 | 0.69 |

Figure 8:
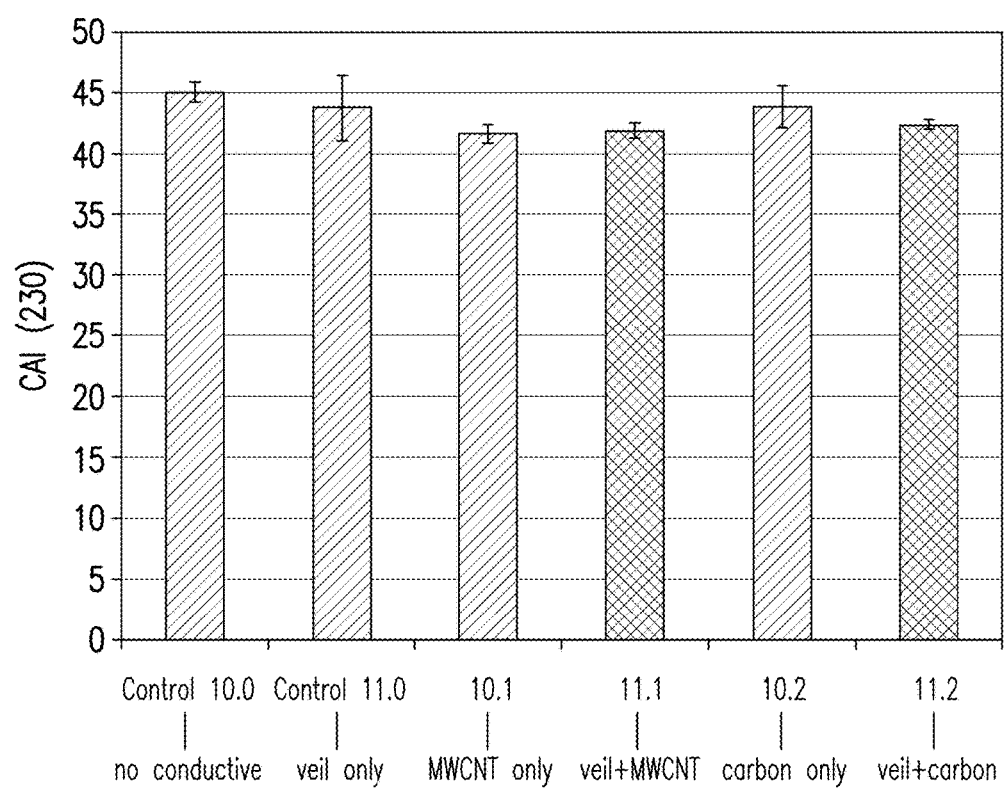
FIG. 8 is a graphic summary of Compression After Impact (CAI) data for various composite laminates, showing the effect of carbon veil and conductive nanoparticles.

The results demonstrate that the combination of lightweight carbon veil and nanoparticles did not produce any significant variation in the composite's mechanical performance. FIG. 8 shows a graphic summary of the results for CAI at 230 in-lbs impact reported in Table 9. As can be seen from FIG. 8, the CAI values were not substantially affected by the presence of the carbon veil or conductive nanoparticles.

What is claimed is:

1. A curable composite material comprising:
   at least two layers of reinforcement carbon fibers impregnated with a curable matrix resin; and
   an interlaminar region formed between adjacent layers of reinforcement carbon fibers, the interlaminar region comprising (i) a curable matrix resin that is the same as or different from the matrix resin impregnating the reinforcement carbon fibers, (ii) conductive nano-sized particles dispersed throughout the matrix resin at the interlaminar region, and (iii) an uncoated nonwoven carbon veil embedded in the matrix resin at the interlaminar region,
   wherein
   each of the conductive nano-sized particles has at least one dimension smaller than about 100 nm,
   the nonwoven carbon veil is comprised of randomly arranged uncoated carbon fibers and has an areal weight of about 1 gsm to about 10 gsm, and
   the conductive nano-sized particles and the nonwoven carbon veil are the only conductive components at the interlaminar region.
2. The curable composite material of claim 1, wherein the interlaminar region further comprises polymeric particles.
3. The curable composite material of claim 2, wherein at least some polymeric particles penetrate through the nonwoven carbon veil.
4. The curable composite material of claim 2, wherein the polymeric particles is present at a content of about 2% to about 20% by weight based on the total weight of the matrix resin in the composite material.
5. The curable composite material of claim 2, wherein the polymeric particles are insoluble thermoplastic or elastomeric particles, and
   said insoluble particles remain as discreet particles at the interlaminar region upon curing of the composite material.
6. The curable composite material of claim 5, wherein the polymeric particles are insoluble thermoplastic particles comprising at least one thermoplastic polymer selected from the group consisting of: polyimide, polyamideimide, polyamide, polyphthalamide, polyetherketone, polyetheretherketone, polyetherketoneketone, polyaryletherketones, polyphenylenesulfide, liquid crystal polymers, and copolymers thereof.
7. The curable composite material of claim 5, wherein the polymeric particles are insoluble elastomeric particles comprising at least one polymeric material selected from the group consisting of: cross-linked polybutadiene, polyacrylic, polyacrylonitrile, and polystyrene.
8. The curable composite material of claim 2, wherein the polymeric particles are crosslinked particles, each particle comprising one of:
   (a) a crosslinking network created by crosslinking a cross-linkable thermoplastic polymer having one or more one or more reactive groups with a cross-linking agent that is chemically reactive to the reactive groups, and
   (b) an inter-penetrating polymer network (IPN) comprising thermoplastic polymer chains intertwined with an independent crosslinking network, wherein said IPN is created by reacting at least one compound having one or more reactive groups, a crosslinking agent that is chemically reactive to the reactive groups, and a thermoplastic polymer.
9. The curable composite material of claim 1, wherein the conductive nano-sized particles are carbon-based, nano-sized structures selected from the group consisting of: carbon nano-tubes (CNTs), carbon nano-fibers, carbon nano-ropes, carbon nano-ribbons, carbon nano-fibrils, carbon nano-needles, carbon nano-sheets, carbon nano-rods, carbon nano-cones, carbon nano-scrolls having scroll-like shapes, carbon nano-ohms, carbon black particles, graphite nano-platelets, graphite nano-dots, graphenes, and combination thereof.
10. The curable composite material of claim 9, wherein the carbon-based, nano-sized structures are carbon nano-tubes (CNTs).
11. The curable composite material of claim 1, wherein the conductive nano-sized particles are present in an amount within the range of about 0.1% to about 10% by weight based on the total weight of the matrix resin in the composite material.
12. The curable composite material of claim 1, wherein the interlaminar region comprises a curable matrix resin which is substantially the same as or different from the curable matrix resin impregnating the reinforcement carbon fibers.
13. The curable composite material of claim 1, wherein the curable matrix resin impregnating the reinforcing fibers further comprises conductive nano-sized particles dispersed throughout.
14. The curable composite material of claim 1, wherein the matrix resin impregnating the reinforcement fibers comprises one or more thermoset resins.
15. The curable composite material of claim 14, wherein the thermoset resins are selected from: epoxy resins, imides, vinyl ester resins, cyanate ester resins, phenolic resins, benzoxazines, formaldehyde condensate resins, unsaturated polyesters, and combinations thereof.
16. The curable composite material of claim 1, wherein at least one layer of reinforcement carbon fibers is in the form of continuous unidirectional fibers or a woven fabric.
17. A curable composite material comprising:
   at least two layers of reinforcement carbon fibers impregnated with a curable matrix resin; and
   an interlaminar region formed between adjacent layers of reinforcement carbon fibers, the interlaminar region comprising: (i) a curable matrix resin that is the same as or different from the matrix resin impregnating the reinforcement carbon fibers, (ii) conductive nano-sized particles dispersed throughout the matrix resin at the interlaminar region, and (iii) an uncoated nonwoven carbon veil embedded in the matrix resin at the interlaminar region, and (iv) polymeric particles embedded in the matrix resin at the interlaminar region, wherein the conductive nano-sized particles are carbon nanotubes or carbon particles, the conductive nano-sized particles are present in an amount within the range of about 0.1% to about 10% by weight based on the total weight of the matrix resin in the composite material, each of the conductive nano-sized particles has dimensions smaller than about 100 nm, the nonwoven carbon veil is comprised of randomly arranged uncoated carbon fibers and has an areal weight of about 1 gsm to about 10 gsm, and the conductive nano-sized particles and the uncoated nonwoven carbon veil are the only conductive components at the interlaminar region.

* * * * *